Patented June 29, 1943

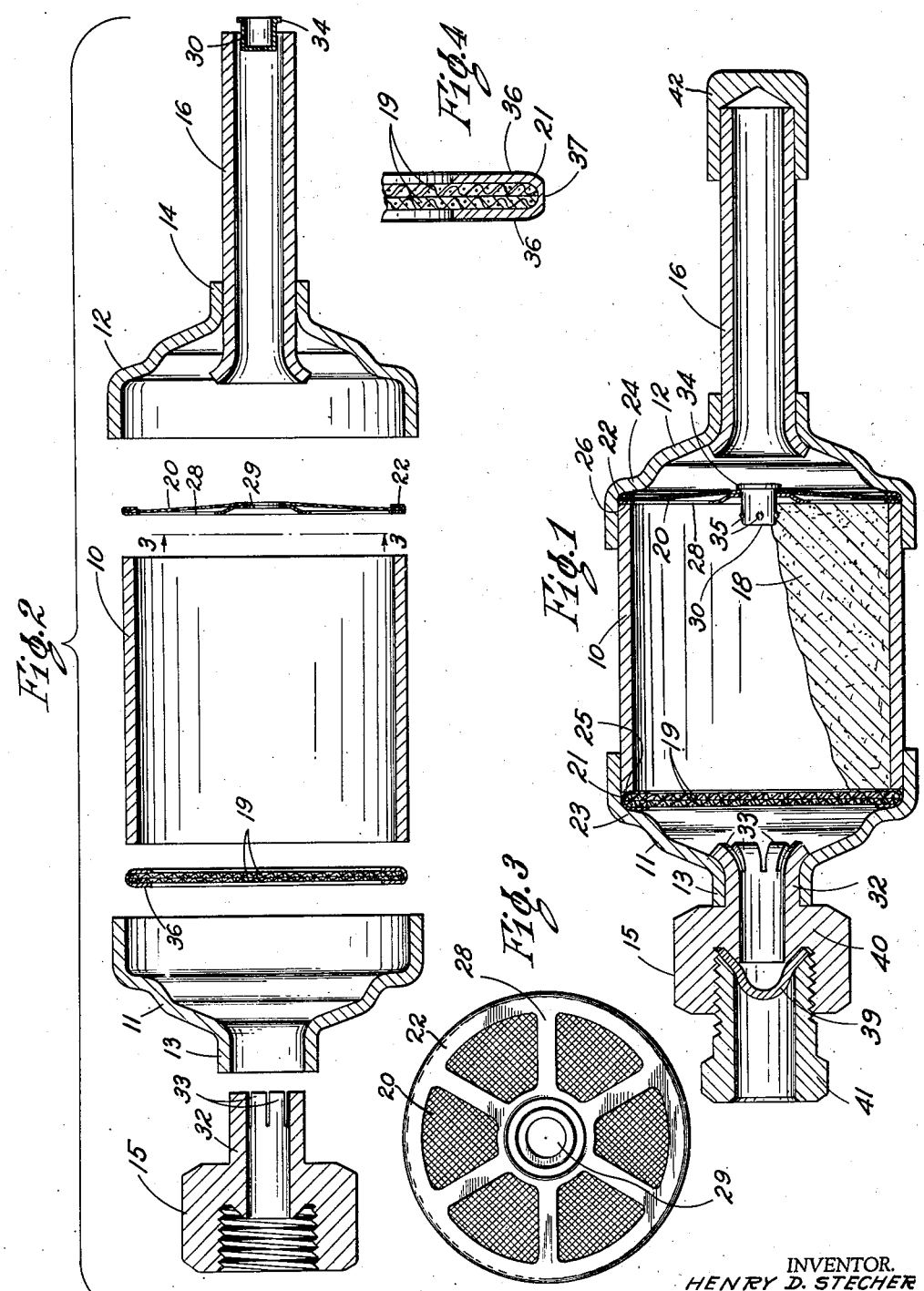

2,323,160

UNITED STATES PATENT OFFICE 2,323,160

DEHYDRATOR

Henry D. Stecher, Lakewood, and Joseph Norman Paquin, Euclid, Ohio, assignors to The Weatherhead Company, Cleveland, Ohio, a corporation of Ohio Application February 15, 1940, Serial No. 319,046

3 Claims. (Cl. 183—4)

This invention relates to dryers or dehydrators or similar fluid treating devices such as are used in mechanical refrigeration systems and in other situations where it is important to remove moisture or other undesirable materials from fluids, for example, in conjunction with vacuum operated aircraft instruments. It is among the objects of the invention to provide a compact, light weight and efficient dryer or similar device which is leakproof and safe, and which can be manufactured economically and rapidly. Another object is to provide a device which will also act as a filter and in which means are provided for preventing the moisture absorbing material from being carried along with the fluid passing through the dryer. Another object of our invention is to provide an efficient and economical method of manufacturing such a device. The invention is described herein with particular reference to dryers or dehydrators, but it is to be understood that the invention may also be applied to other types of devices, such as filters for example, for treating or purifying fluids.

In mechanical refrigeration systems, for example, and particularly those operating with sulphur dioxide as the refrigerant, it is important to remove all traces of water vapor from the gas, in order to prevent corrosion of the parts of the refrigerator by moist gas and to prevent stoppage of action due to freezing of moisture. It has been the practice, heretofore, to employ moisture absorbing materials such as silica gel for the purpose of removing the moisture from the gas, but the dryers known before the present invention were bulky, expensive and difficult to manufacture. Due to their cost, it was necessary to remove such dryers from the systems and only use them in conjunction with charging the systems. The bulk and weight of prior devices was disadvantageous in aircraft installations.

According to the present invention, dryers or dehydrators may be economically and efficiently manufactured by forming small, generally cylindrical containers from tubular or pressed metal parts, the containers being provided with means such as couplings, fittings or tubes for connection to the refrigeration systems, and having within the containers a quantity of moisture absorbing substance such as silica gel. The silica gel is retained within the containers by fine mesh screens, which prevent any abrasive particles from being carried out of the container along with the fluid passing therethrough, and according to a preferred method of manufacture, the parts of the container are secured together and the screens fastened in place by a copper brazing operation carried out in a furnace having a reducing atmosphere. After the brazing operation has been completed, the container is charged with the silica gel, preferably through an opening in one of the screens and thereafter, the opening is closed off. By this method, the containers can be made of inexpensive steel parts, and the copper brazing operation insures a strong and leak-proof construction.

Referring to the drawing, Fig. 1 is a longitudinal section through a dryer or dehydrator made according to a preferred form of the invention; Fig. 2 is a view showing the parts making up the device shown in Fig. 1, but before they have been assembled together, and Figs. 3 and 4 are details of the screens employed to prevent the silica gel from escaping from the container.

As shown on the drawing, a dehydrator made according to our invention preferably comprises a chamber made up of a central cylindrical section 10, and end members 11 and 12, preferably in the form of hollow stampings having flanges adapted to embrace the central section and drawn portions 13 and 14, respectively, adapted for connection with the fitting 15 and the tube 16.

In the completed dryer, the central portion of the container is substantially filled with fine granules of silica gel, indicated at 18, which are retained in position by fine mesh screens, 19 and 20. The edges of the woven screen material are preferably housed by channel section rings 21 and 22. As shown in the drawing, the screens fit within the end members or caps 11 and 12, being disposed between the inwardly extending, generally radial portions 23 and 24 and the end faces 25 and 26 of the tubular member 10, and while the engagement between the channel section members and the adjacent end members and central member 10 may be sufficient to retain the screens in position, the screens are preferably brazed in position in a manner described in greater detail below. One of the screens, 20 for example, is provided with a spider 28 and a central opening 29 as shown in Fig. 3. This opening is employed in filling the container with the silica gel and thereafter is closed by the plug 30.

The various parts are illustrated in position for assembly in Fig. 2 of the drawing, and as shown therein, all of the parts are of simple and inexpensive construction; thus, the body portion 10 may comprise an inexpensive section of tubing; the end members 11 and 12 are identical stampings which may be made readily and economically from inexpensive, ferrous material. The fitting 15 is a simple tube fitting of well-known design, provided with a slotted projecting portion 32, for engagement with the neck 13 of the end member 11, and the member 16 is merely a small piece of tubing having one end flared, as indicated at 26, and adapted to engage within the neck portion 14 of the end member 12. Obviously, various other fluid connection devices may be used in place of the members 15 and 16, these particular devices being shown only by way of example.

In assembling the various parts, the portion 32 of the fitting 15 may be inserted within the neck 13, of the member 11, preferably with a light press fit. After these parts are assembled, the fingers 33 of the neck portion 32, are expanded outwardly into engagement with the inner surface of the member 11, taking the position shown in Fig. 1. By this means, the fitting 15 is firmly held in position. Similarly, tube 16 is inserted through the neck portion 14 of member 12 until the flared end 26 of the tube is firmly in engagement with the inner surface of the neck portion. Thereafter, the screens 19 and 20 are inserted within the end members, 11 and 12, and finally the end members 11 and 12 and associated fittings and screens are assembled with the central tubular member 10.

The assembly is then ready for the brazing operation which is preferably carried out by supplying metallic copper to or adjacent the contacting surfaces of the several parts and passing the assembly through a brazing furnace having a reducing atmosphere in which the temperature of the parts is raised to about 2200 deg. F. At this temperature, and in the proper atmosphere, the copper becomes fluid and forms an alloy with the adjacent surfaces of the ferrous material. The copper is drawn by capillary attraction between the contacting surfaces of the material and upon cooling, forms an extremely strong alloy bond throughout substantially the entire contacting areas of the parts. The copper may be supplied in various ways known to those skilled in the art. For example, the parts may be electro-plated with copper or small copper wires may be disposed adjacent the contacting surfaces before the assembly is placed in the furnace.

After the assembly is removed from the furnace and cooled, the dryer is completed by inserting a small funnel through the tube 16, and through the opening 29 in the screen 20. The required quantity of silica gel, or other moisture absorbing material, is then poured into the central chamber. Thereafter, the funnel is removed and the opening 29 closed as by the plug 30, which preferably comprises a small thin wall brass eyelet. The eyelet is inserted through the opening 29 until the flange 34 of the eyelet engages the spider 28 adjacent the edge of the opening 29. Thereafter, the projections 35 are formed in the eyelet by means of a tool having small outwardly extending points which can be forced away from each other, the projections functioning to prevent the eyelet from being displaced from its position within the opening 29.

As stated above, it is preferable to braze the screens 19 and 20 to retain them firmly in position. This presents a problem, inasmuch as during the copper brazing operation the copper becomes very fluid and has a tendency to cover all of the ferrous surfaces to which it has access. It is particularly undesirable to have the copper reach the screen material for screens composed of Monel metal wire are especially adapted for devices of this type, and at furnace temperatures the molten copper has a tendency to dissolve such screens. To prevent this from taking place, the steel channel rings 21 and 22 binding the screen material are coated with a thin layer 36 containing chromium as by plating, and thereafter, the chromium is ground off of the peripheral edge portion thereof, as indicated at 37 in Fig. 4. The chromium prevents the copper from coating the underlying steel, so that the copper will adhere to the steel only where the chromium plating has been removed as at 37. By this means, the screens can be brazed firmly in place, but the protected areas of the channel members 21 and 22 prevent the copper from reaching the screens themselves. Obviously, this method of preventing copper from adhering to certain areas of parts during a copper brazing operation, may be applied to the production of other articles and devices. Alternatively, the material of the screens 19 and 20 may be chrome plated to protect them from the action of the copper or the screens may be made of a chromium containing alloy such as stainless steel, to which the copper will not adhere. In either of these last mentioned cases, the steel binding rings 21 and 22 will not require the chromium plating described above.

Before shipment, the moisture absorbing material within the container is preferably protected from the atmosphere by closing the passages through the fitting 15, and the tube 16. The fitting 15 may be conveniently closed by a conical stamping 39, which is clamped against the seat 40 of the fitting by the nut 41 of a well-known type. The tube 16 may be sealed off by means of a cap 42, preferably soldered thereto. The stamping 39 and the cap 42 function to prevent the entrance of air and moisture into the container, and are removed immediately before the dryer is placed in service.

From the foregoing description of a preferred form of our invention, it will be evident that we have provided compact, light-weight and durable fluid treating devices which are suited to a variety of uses and are especially adapted for use in mechanical refrigeration systems. Devices embodying our invention can be manufactured economically and efficiently, are strong and leak-proof and may be safely employed in refrigeration systems because of their leak-proof construction of copper brazed steel parts. Because of the fact that the silica gel or other moisture absorbing or purifying material is retained within the container and prevented from being carried along with the fluid passing through the devices, and as the devices may also act as filters, our devices prevent the instruments or machines with which they are used from being damaged by abrasive particles. Because of this fact and because of their light weight, our devices are also particularly advantageous in conjunction with aircraft instruments.

Various modifications and changes can be made in our invention without departing from the spirit and scope thereof. Therefore, it is to be understood that the foregoing description of a preferred form of our invention is given only by way of example, and that our patent is not limited to the preferred form described herein, or in any manner other than by the scope of appended claims, when given the range of equivalents to which our patent may be entitled.

Reference is hereby made to our co-pending application Serial No. 485,524, filed May 3, 1943, which contains claims directed to the method of copper brazing disclosed herein.

We claim:

1. A dryer comprising a unitary assembly including a tubular portion, an end member having an opening therethrough and copper brazed to said tubular portion, and a fine mesh screen disposed within said assembly adjacent one end of said tubular portion, said screen having an opening in registration with the opening in the adjacent end member whereby moisture absorbing material may be placed within said central portion through said registering openings, and means for closing said opening after the moisture absorbing material has been placed within said central portion.

2. A dryer comprising a unitary assembly including a hollow member adapted to contain a moisture absorbing material, a fluid conduit leading into said hollow member, a fine mesh screen disposed within said hollow member adjacent said fluid conduit and having an opening in registration therewith whereby moisture absorbing material may be placed within said hollow member through said conduit and said opening, and a plug insertable through said conduit for closing said opening in said screen.

3. A dryer for refrigeration systems comprising a unitary assembly including a central tubular portion, end members having openings therethrough, and fine mesh screens permanently secured within said assembly at each end of said tubular portion, one of said screens having an opening in registration with the opening in the adjacent end member whereby moisture absorbing material may be placed within said central portion, and means, comprising an eyelet inserted in said opening in said screen and having a portion thereof expanded to retain the eyelet in position, for closing said opening after the moisture absorbing material has been placed

HENRY D. STECHER.
JOSEPH NORMAN PAQUIN.

CERTIFICATE OF CORRECTION.

Patent No. 2,323,160.                                    June 29, 1943.

HENRY D. STECHER, ET AL.

It is hereby certified that error appears in the printed specification of the above numbered patent requiring correction as follows: Page 3, second column, line 18, claim 3, after the word "placed" insert --within said central portion.--; and that the said Letters Patent should be read with this correction therein that the same may conform to the record of the case in the Patent Office.

Signed and sealed this 27th day of July, A. D. 1943.

(Seal)
                                              Henry Van Arsdale,
                                         Acting Commissioner of Patents.